(12) United States Patent
Neuman

(10) Patent No.: US 9,709,273 B2
(45) Date of Patent: Jul. 18, 2017

(54) PORTABLE CHARCOAL STARTING GRILL

(71) Applicant: Charles Neuman, Sherrills Ford, NC (US)

(72) Inventor: Charles Neuman, Sherrills Ford, NC (US)

(73) Assignee: Charles Anthony Neuman, Sherrills Ford, NC (US)

( * ) Notice: Subject to any disclaimer, the term of this patent is extended or adjusted under 35 U.S.C. 154(b) by 0 days.

(21) Appl. No.: 14/885,856

(22) Filed: Oct. 16, 2015

(65) Prior Publication Data

US 2017/0038070 A1    Feb. 9, 2017

Related U.S. Application Data

(60) Provisional application No. 62/200,295, filed on Aug. 3, 2015.

(51) Int. Cl.
| | | |
|---|---|---|
| F23Q 7/16 | (2006.01) | |
| F23Q 7/02 | (2006.01) | |
| F24B 15/00 | (2006.01) | |
| A47J 37/07 | (2006.01) | |

(52) U.S. Cl.
CPC ............... F23Q 7/02 (2013.01); F23Q 7/16 (2013.01); A47J 37/079 (2013.01); F24B 15/005 (2013.01)

(58) Field of Classification Search
CPC ..... F23Q 7/00; F23Q 7/02; F23Q 7/14; F23Q 7/16; F24B 15/005; A47J 37/079
See application file for complete search history.

(56) References Cited

U.S. PATENT DOCUMENTS

| | | | | |
|---|---|---|---|---|
| 2,476,370 | A | * | 7/1949 | Hanley .................. F42B 3/128 102/202.14 |
| 2,917,675 | A | * | 12/1959 | Norton, Jr. ............ A47J 37/079 219/228 |
| 2,920,243 | A | * | 1/1960 | Taren .................... A47J 37/079 126/25 B |
| 2,922,016 | A | | 1/1960 | Persinger |
| 3,046,381 | A | | 4/1962 | Oslang |
| 3,060,868 | A | | 10/1962 | Maclachlan |
| 3,296,955 | A | | 1/1967 | Scheanil |
| 3,339,505 | A | | 9/1967 | Bean |
| 3,396,715 | A | * | 8/1968 | Allen .................. A47J 37/0709 126/25 B |
| 3,487,199 | A | | 12/1969 | Hamlin |
| 3,491,744 | A | * | 1/1970 | Von Kohorn, Jr. .... A47B 31/02 126/25 R |
| 3,529,557 | A | * | 9/1970 | Treanor ................ A47J 37/079 126/25 B |
| 3,628,474 | A | | 12/1971 | Rehwaldt |
| 4,406,941 | A | | 9/1983 | Schmerein, Jr. |
| 4,481,408 | A | | 11/1984 | Scheufler |
| 4,649,260 | A | * | 3/1987 | Melis .................... F24B 15/005 126/152 R |

(Continued)

*Primary Examiner* — Christopher Harmon

(57) ABSTRACT

Portable Charcoal Starting Grill (FIG. 4) has a built in replaceable/interchangeable heating element in the grate (FIG. 3) that is used to start the charcoal briquettes. Electric current to power the electric heating element (FIG. 2) comes from an interchangeable/rechargeable battery (FIG. 5) that is built on the side railing 12 of the grill (FIG. 4). Predetermined configuration of the heating element will start the charcoal briquettes on fire in a more uniform evenly manner.

3 Claims, 5 Drawing Sheets

(56) References Cited

U.S. PATENT DOCUMENTS

Figure 1:
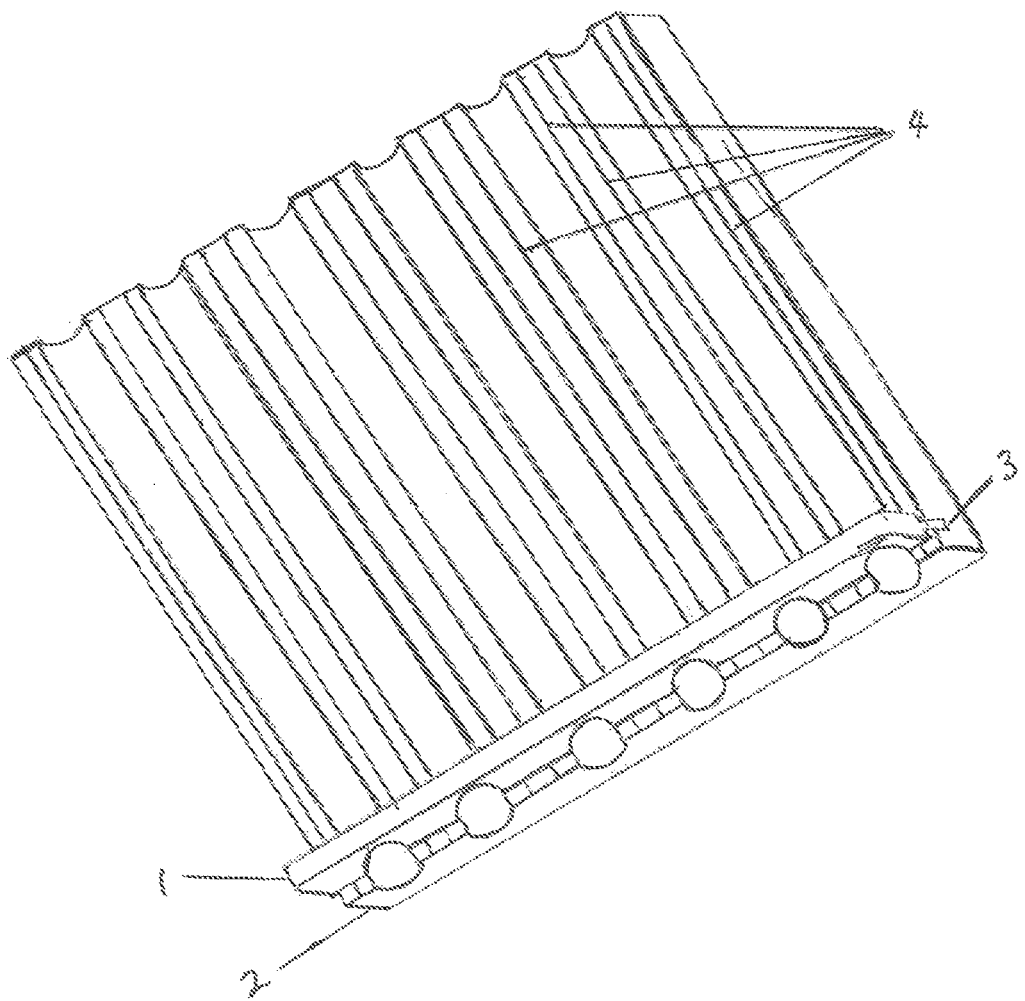

| | | | |
|---|---|---|---|
| 4,901,196 A * | 2/1990 | Grzybowski | ............ F23Q 7/16 |
| | | | 219/237 |
| 5,174,197 A | 12/1992 | Upton | |
| 5,197,455 A | 3/1993 | Tessien | |
| 5,485,816 A | 1/1996 | Cox | |
| 5,730,114 A | 3/1998 | Fabrikant | |
| 9,237,828 B2 * | 1/2016 | Walters | ............... A47J 37/0704 |

* cited by examiner

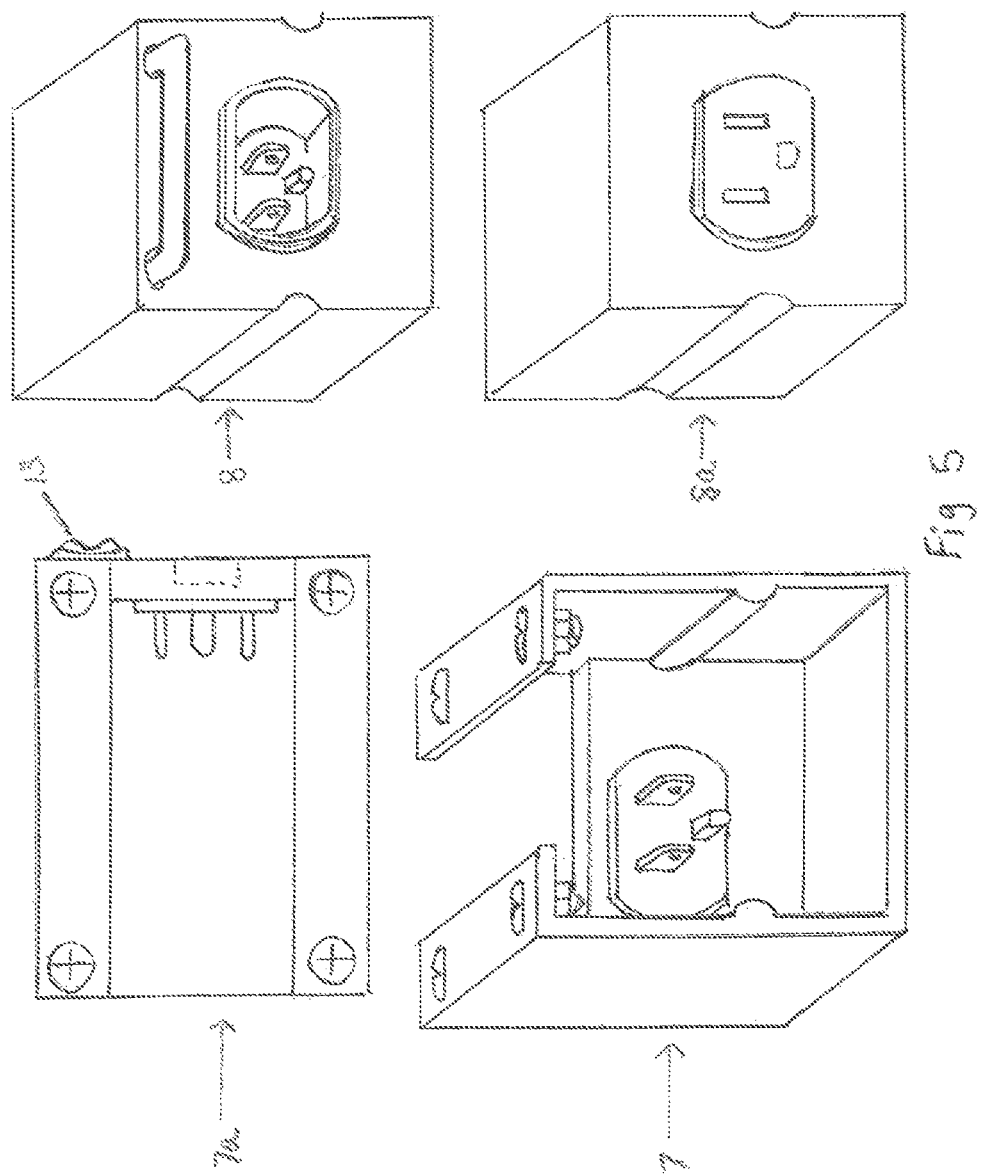

PORTABLE CHARCOAL STARTING GRILL

This application claims the benefit of PPA serial Application #62200295 filed: 3 Aug. 2015 by the present inventor, which is incorporated by reference.

BACKGROUND

This application pertains to an easier, safer, and more convenient way to start the charcoal briquettes in a grill.

Starting the charcoal briquettes in a charcoal grill has been challenging for many people. Lighter fluid is mostly used today to start the charcoal briquettes. But when using lighter fluid it creates a new problem, knowing how much lighter fluid is required to engage the different quantities of the charcoal briquettes. If not enough is used, the charcoal briquettes won't catch on fire, and you would have to re-douse the charcoal briquettes with the lighter fluid. If too much is used, the charcoal briquettes will burn inefficiently. If you start cooking too early before all the lighter fluid is burned up, your food will have lighter fluid taste.

Prior Art Background

This problem of using lighter fluid was partially solved by the Electric Igniting Device U.S. Pat. No. 4,406,941 A to Schmerein Jr, dated Mar. 25, 1982. The Electric Igniting Device is a separate mechanism from the grill. It is an oblong shape coil that has a handle, and is connected to an electric source for power. It is placed on the bottom of the grill, on top of the charcoal grate (i.e. grate). The grill mesh (on which the food is cooked), does not fit uniformly flush with the Electric Igniting Device in the grill. The power source cord connecting to the heating element is in the way. The charcoal briquettes are then piled on top of the coil. Since the Electric Igniting Device is a separate mechanism from the grill, it must be carefully removed and placed somewhere away from children, pets, people who are not aware of the danger, or any objects unprotected by the extreme heat.

After the charcoal briquettes are set on fire and after removing the heating element, the hot coals must be spread out evenly on the grate, the grill mesh must then be placed on top of the hot grill before starting to cook.

U.S. Pat. No. 3,296,955 to Scheaneil, dated Jan. 10, 1967 the Portable Charcoal-Electric Grill suggests using a car battery to turn the rotatable spit rod consisting of detachable parts, and using an electric motor fan to accelerate the burning of the charcoal briquettes. Liquid fuel is first needed to start the charcoal briquettes.

U.S. Pat. No. 3,529,557 to Treanor, dated Sep. 22, 1970, attacks the problem in another way. Treanor employs a mesh basket for containing the charcoal and has integrally attached to the basket an electric heating element. This arrangement requires lifting the filled container and dumping the hot coals through the top opening of the basket into the coal pan of the charcoal grill. Extreme care must be exercised to avoid accidents during this operation.

U.S. Pat. No. 3,628,474 to Rehwaldt, dated Dec. 21, 1971, suggests a charcoal starting device which consists of a basket having upstanding wire mesh sidewalls and a slot through which a separate electric starting device may be inserted. The employment of a separate basket and a separate starting element requires handling each unit individually necessitating great dexterity and skill. In addition, care must be exercised in setting aside the hot starting element after the coals are ignited.

U.S. Pat. No. 5,730,114A to Fadrikant, dated Jan. 15, 1997, the Charcoal Grilling System With Electric Ignition improves the ignition of the charcoal briquettes with electrical ignition built into the firebox. In claim #2 this grill claims a power supply cord that connects to an external power source. Like other above embodiment some kind of power supply cord is needed to start an electrical ignition grill. In addition it does not address the vulnerability of the heating element. The heating element is heated to a high temperature and cooled over and over again.

It is dangerous to have an electrical cord connected to a hot grill that is in use. A person could trip on the cord causing hot coals to spill on oneself, and/or on other people.

Moving hot coals around the grate, after the charcoal briquettes have been set on fire, increases the chance of burning oneself.

Each time the grill is used the heating element is heated to an extreme temperature, and then cooled, and because of this, heating elements are highly susceptible to breakage.

SUMMARY

The Portable Charcoal Starting Grill has a removable/rechargeable battery, and an electric heating element built in the grate. The electrical heating element can be replaced by removing the removable top portion of the grate. The electric heating element allows the charcoal briquettes and wood to start a fire without the need of lighter fluid, matches, or any other external mechanism. The removable/rechargeable battery unit allows for plural amount of batteries. They can be charged away from the grill, so no electrical cord is required to connect the grill to any external power source. The Electric heating element will come in different sizes and shapes, including coils and rods. These heating coils or rods will be placed in a predetermined configuration to start the charcoal briquettes more evenly and reliably.

DRAWING

FIG. 1—is a perspective top view of the charcoal grate (a.k.a. grate)

Figure 2:
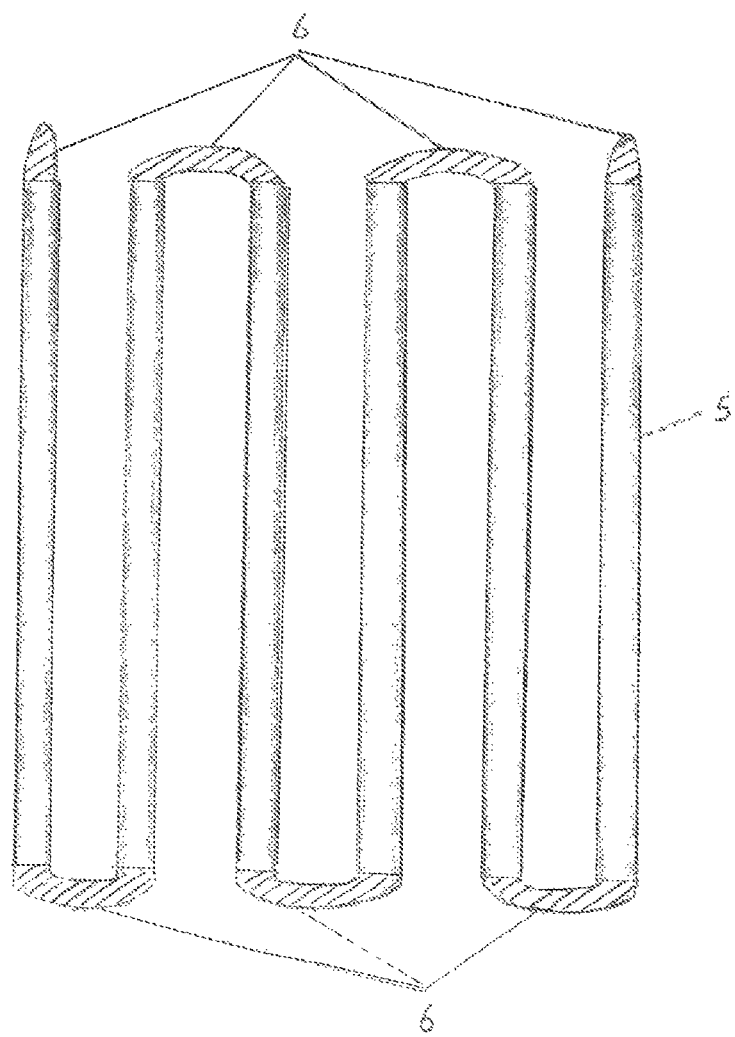

FIG. 2—is the top view of the heating element.

Figure 3:
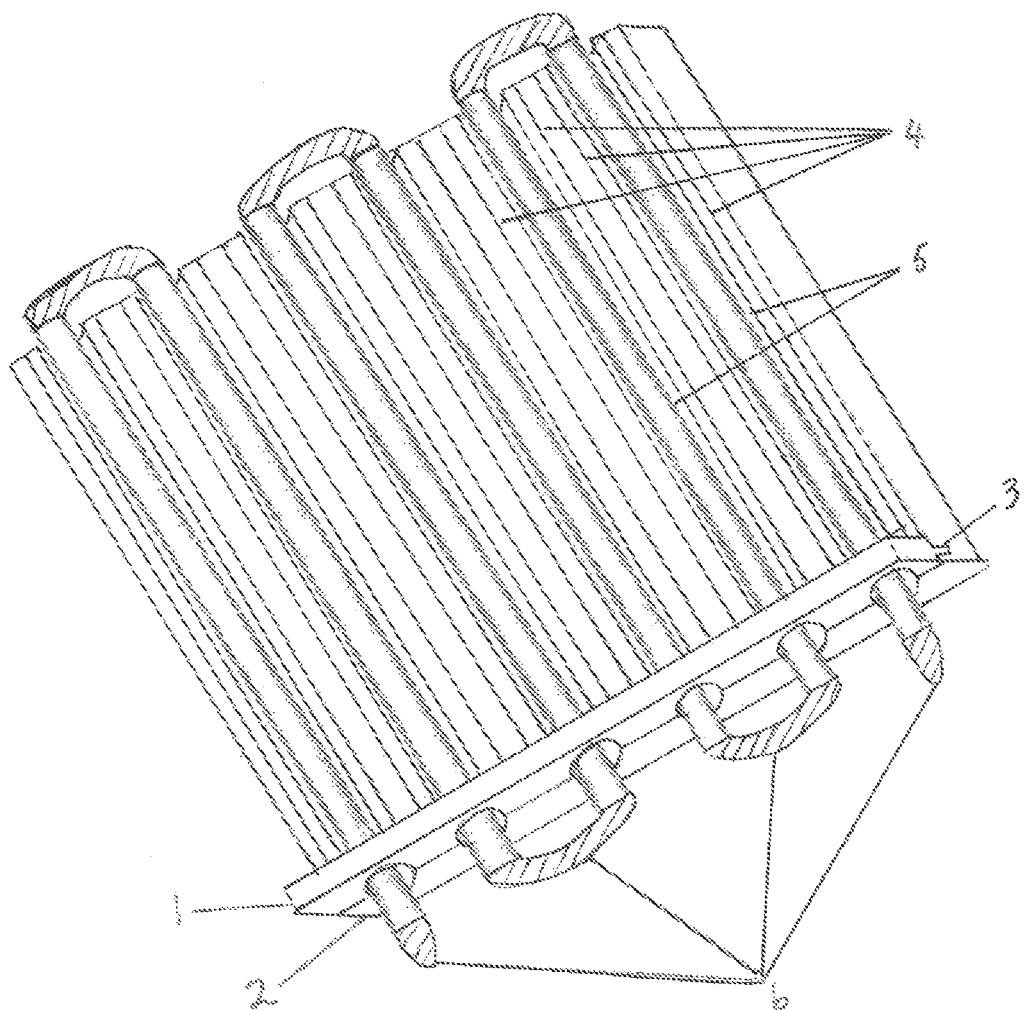

FIG. 3—is a perspective top view of the grate with the heating element housed in the grate.

Figure 4:
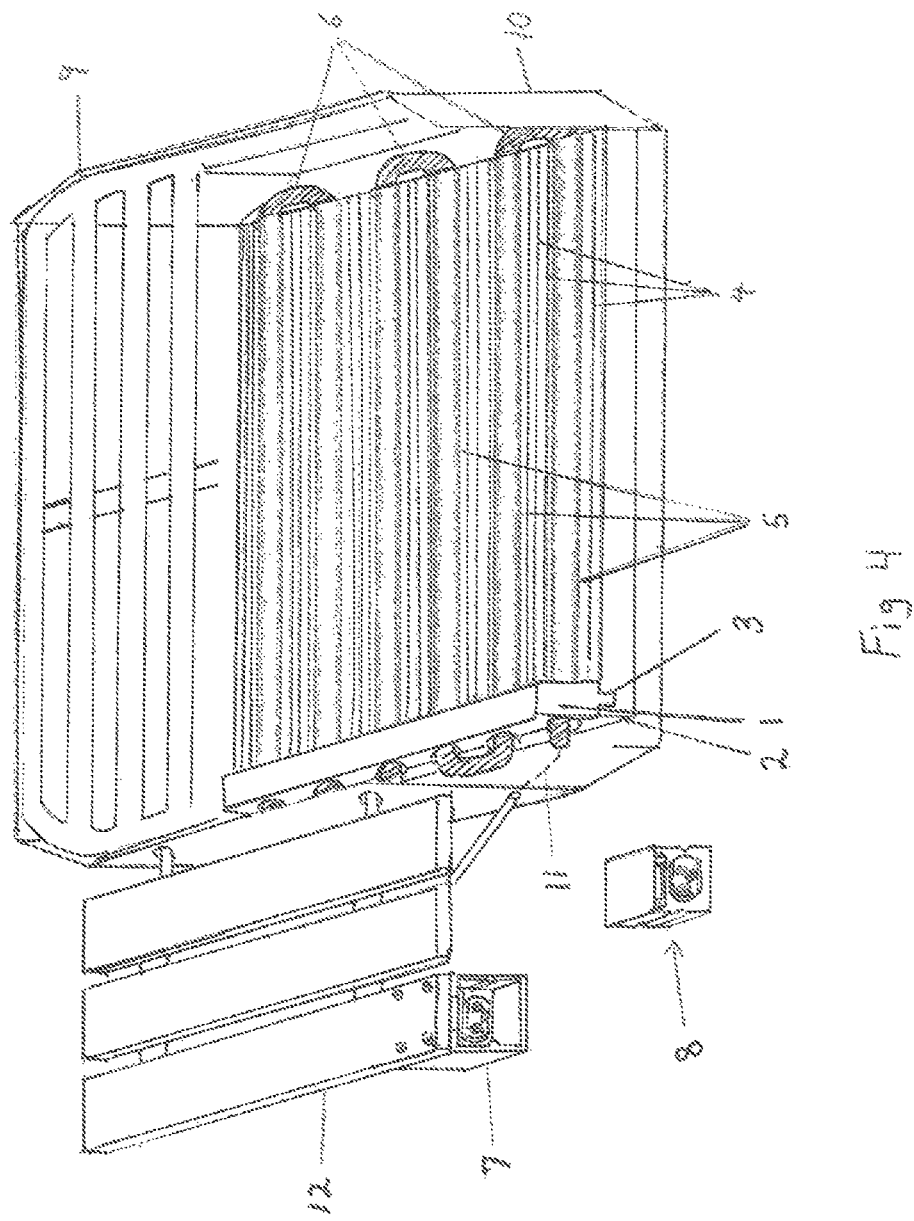

FIG. 4—is a tilted top frontal view of the Portable Charcoal Starting Grill with the side and part of the grill mesh missing. It shows what an example grill will look like.

FIG. 5—is two different views of the battery housing and two different views of the rechargeable battery.

REFERENCE NUMBER

1—top bracket
2—bottom bracket
3—bracket clip
4—wire grate
5—heating rods
6—heat insulating covers
7—battery housing
7a—battery housing
8—interchangeable/rechargeable battery
8a—interchangeable/rechargeable battery
9—grill mesh
10—outer grill
11—heat insulated electrical wire
12—side railing
13—on and off switch

DETAILED DESCRIPTION

FIG. 1 is a perspective top view of a charcoal grate (a.k.a. grate). It is the housing for the heating element. It consists of removable top bracket 1 and bottom bracket 2. Bottom bracket 2 is connected to the wire grate 4. Top bracket 1 has bracket clips 3 on each end.

FIG. 2 is a top view of the heating element. The heating rods 5 are covered by the heat insulating covers 6 at the end of each rod.

FIG. 3 is a perspective top view of the grate (FIG. A) with the heating element (FIG. B) being housed between the top bracket 1 and the bottom bracket 2. Both brackets are securely held together by the bracket clips 3.

FIG. 4 is a tilted top frontal view of the Portable Charcoal Starting Grill. Front part of the outer grill 10 and part of the grill mesh 9 are not drawn to show the interior of the grill. Battery housing 7 is connected to the underside of the side railing 12. Heat insulated electrical wire 11 connects the heating element (FIG. 2) to the battery housing 7. The grill mesh 9 is where the food is cooked. The interchangeable/rechargeable battery 8 is shown outside the battery housing 7. (FIG. 1), (FIG. 2), and (FIG. 3) combined make up the rest of the detailed description of (FIG. 4).

FIG. 5 has two views for the battery housing and two views of the interchangeable/rechargeable battery:

7a—is a top view of the battery housing. On and off switch for the heating element is connected in the back of the housing.

7—is a perspective frontal view of the battery housing. Male plug is shown in the back of the battery housing.

8—is a perspective frontal view of the interchangeable/rechargeable battery. Male plug is shown.

8a—is a perspective back view of the interchangeable/rechargeable battery. Female plug is shown.

Operational

Inside of the Portable Charcoal Starting Grill (FIG. 4), metallic heating coils or heating rods 5 will run parallel to the wire grate 4 ex: (FIG. 3). These heating rods 5 will be electrically heated to a high temperature, in turn heating and burning the charcoal briquettes.

(1) The heating rods 5 will be strategically placed in a predetermined way, ex. (FIG. 3), so the charcoal will set a fire evenly and uniformly.

(2) The top portion of the grate, a.k.a. top bracket 1, will be removable so the heating element (FIG. 2) can be exchanged if the heating element (FIG. 2) fails from the constant heating and cooling.

(3) The bracket clips 3 will hold the top bracket 1 and the bottom bracket 2 together after the heating element (FIG. 2) has been replaced.

(4) The Heat insulating cover 6 is used to protect the outer grill 10.

(5) No external power source would be needed during the usage of the grill, because there is an interchangeable/rechargeable battery 8 that is connected to the battery housing 7 on the side railing 12 of the grill (FIG. 4).

(6) The heating element (FIG. 2) will connect to the battery housing 7 by the heat insulated electrical wire 11.

(7) There can be an on and off switch 13, so when the charcoal briquettes are set on fire and burning, the heating rods 5 could be shut off.

Description/Additional Embodiment

The heating element (FIG. 2) in the Portable Charcoal Starting Grill (FIG. 4) can be shaped bulbous, oblong, or any predetermined shape and size, that protrudes from the grate (FIG. 1). Either the heating element (FIG. 2) or the grate (FIG. 1) will be mechanically movable (up and down).

Operational/for Additional Embodiment

After the charcoal briquettes are lit by the heating element (FIG. 2), the grate (FIG. 1) or the heating element (FIG. 2) will move up and down using a lever on the side of the outer grill 10. This will allow the heating element (FIG. 2) to be away from the coals and not touch it during cooking.

Also after the charcoal briquettes are set on fire to one's desired specification, the heating element (FIG. 2) can retract back into the predetermined caging or compartment in the grate (FIG. 1). This will extend the life of the heating element (FIG. 2).

Conclusion

The Portable Charcoal Starting Grill (FIG. 4) is a grill that is convenient and easy to use. It can be used in parks, lakes, camping grounds and etc. It can be transported in a car, RV, or campers with no worries of carrying the highly flammable lighter fluid, and the fumes it permeates.

1. This grill could start the charcoal briquettes without external power source, so there will be no taste of lighter fluid.

2. The charcoal briquettes will start more uniformly and efficiently.

3. The usage of the grill will be more convenient, and quicker to start the charcoal briquettes with the interchangeable/rechargeable batteries 7.

4. The heating coil (FIG. 2) could be replaced after being worn out from the constant heating and cooling.

5. The heating rods 5 and coils could be placed in a small grill that sits on a restaurant table, to a hibachi size grill, to a Weber size grill, to a big barrel size, and every size in between.

6. Currently I contemplate using metallic rods and coils for the heating element. However, they can come in different sizes and shapes.

7. Currently I contemplate the heating element to be stationary during usage. However, the heating element or the grate can move mechanically up and down allowing separation of the heating element from the hot coils.

This embodiment is automatic charcoal starting grill that has a built in heating element built into the grill. Predetermined configuration of the heating element means the charcoal will start in a uniform evenly manner. Said heating element can be powered by detachable battery which will allow the battery to be charged away from the grill.

I claim a portable charcoal starting grill comprising:

1. A portable charcoal grill comprising:
   a charcoal grate connected to a bottom bracket;
   a top bracket with clips for securing to said bottom bracket;
   an electric heating element for uniformly starting charcoal upon the grate surface comprising rod lengths configured parallel and adjacent to portions of the grate wherein each rod length of said heating element is removably housed between said bottom bracket and said top bracket in the secured position.

2. The portable charcoal grill of claim 1 wherein the electric heating element is connected to a rechargeable battery or an electric power source for operation.

3. The portable charcoal grill of claim 1 wherein the electric heating element is replaceable.

* * * * *